United States Patent
Horton

(10) Patent No.: US 7,604,753 B2
(45) Date of Patent: Oct. 20, 2009

(54) ELECTROSTATIC DISSIPATIVE PLASTISOLS

(75) Inventor: Stephen D. Horton, Avon Lake, OH (US)

(73) Assignee: Polyone Corporation, Avon Lake, OH (US)

( * ) Notice: Subject to any disclaimer, the term of this patent is extended or adjusted under 35 U.S.C. 154(b) by 0 days.

(21) Appl. No.: 10/595,696

(22) PCT Filed: Nov. 10, 2004

(86) PCT No.: PCT/US2004/037370

§ 371 (c)(1), (2), (4) Date: May 5, 2006

(87) PCT Pub. No.: WO2005/050670

PCT Pub. Date: Jun. 2, 2005

(65) Prior Publication Data

US 2007/0034835 A1  Feb. 15, 2007

Related U.S. Application Data

(60) Provisional application No. 60/520,040, filed on Nov. 14, 2003.

(51) Int. Cl.
| | |
|---|---|
| H01B 1/00 | (2006.01) |
| H01B 1/04 | (2006.01) |
| H01B 1/24 | (2006.01) |
| C08G 75/00 | (2006.01) |
| C08G 73/00 | (2006.01) |
| C08G 73/06 | (2006.01) |

(52) U.S. Cl. ............... 252/500; 252/502; 252/511; 528/377; 528/422; 528/423

(58) Field of Classification Search ............... 252/500, 252/502, 511; 528/377, 422, 423
See application file for complete search history.

(56) References Cited

U.S. PATENT DOCUMENTS

| | | | |
|---|---|---|---|
| 5,217,649 A * | 6/1993 | Kulkarni et al. | 252/500 |
| 5,403,873 A * | 4/1995 | Nakamura et al. | 523/201 |
| 5,620,794 A | 4/1997 | Burkart et al. | |
| 5,624,736 A | 4/1997 | DeAngelis et al. | |
| 5,626,948 A | 5/1997 | Ferber et al. | |
| 5,720,892 A | 2/1998 | DeAngelis et al. | |
| 6,132,644 A | 10/2000 | Angelopoulos et al. | |
| 6,311,350 B1 | 11/2001 | Kaiserman et al. | |
| 6,315,956 B1 * | 11/2001 | Foulger | 422/98 |
| 6,355,389 B1 * | 3/2002 | Miyamoto | 430/45.32 |
| 6,444,359 B1 | 9/2002 | Satoh et al. | |
| 6,562,538 B2 * | 5/2003 | Miyamoto | 430/108.6 |
| 6,764,617 B1 * | 7/2004 | Viswanathan et al. | 252/500 |
| 2001/0052591 A1 | 12/2001 | Kovalev et al. | |
| 2005/0161641 A1 | 7/2005 | Gros | |
| 2006/0011893 A1 | 1/2006 | Gros | |

FOREIGN PATENT DOCUMENTS

| | | | |
|---|---|---|---|
| EP | 0643397 | * | 3/1995 |
| WO | WO 02059907 A1 | | 8/2002 |

* cited by examiner

*Primary Examiner*—Lorna M Douyon
*Assistant Examiner*—Jaison P Thomas
(74) *Attorney, Agent, or Firm*—John H. Hornickel

(57) ABSTRACT

A mixture of inherently conductive polymer and plastisol is disclosed. Articles made from the mixture can be used as electrostatic dissipative (ESD) articles.

13 Claims, No Drawings

ELECTROSTATIC DISSIPATIVE PLASTISOLS

CLAIM OF PRIORITY

This application is a 371 of PCT/US04/37370 filed on Nov. 10, 2004, which claims priority from U.S. Provisional Patent Application Ser. No. 60/520,040 filed on Nov. 14, 2003.

FIELD OF THE INVENTION

This invention relates to plastisols that provide electrostatic dissipative properties.

BACKGROUND OF THE INVENTION

Electrostatic dissipative (ESD) articles are vital to the manufacture of electronic components that are sensitive to static electricity, such as disk drives, semi-conductors, tape and reel assemblies, and electronic assemblies packaging.

Inherently conductive polymers (ICP's) have been found to be very useful in a variety of electrically active materials, such as anti-fouling marine coatings; anti-static fabrics, coatings and packaging; batteries; conductive inks; conductive adhesives; EMI RFI shielding articles, radar or microwave absorption articles, and sensors.

Inherently conductive polymers can be the matrix of the coating. More preferably because of cost, inherently conductive polymers are dispersed in an inert binder to serve as the matrix or continuous phase of the coating.

SUMMARY OF THE INVENTION

What the art needs is a dispersion of inherently conductive polymers in an inert binder that also serves as a barrier after it is coated or molded on a surface of an article. An example of such inert binder is a vinyl plastisol that is easy to use in a variety of articles that also require ESD properties and that is environmentally friendly, relatively inexpensive, easy to apply, and good performing.

The present invention solves the problem in the art by providing a mixture of inherently conductive polymer in a vinyl plastisol.

One aspect of the invention is a mixture comprising inherently conductive polymer and a plastisol. Preferably, the mixture is as coatable or moldable as any other plastisol is, even though the mixture contains inherently conductive polymer.

An advantage of the present invention is the mixture is capable of being processed easily because the ICP does not appreciatively add to the viscosity of the plastisol, and certainly not as much as conductive carbon black adds to the viscosity of the plastisol.

Other advantages of the invention will become apparent when considering the embodiments of the invention.

EMBODIMENTS OF THE INVENTION

Inherently Conductive Polymers

Inherently conductive polymers suitable for the invention include polymers having repeating monomeric units of aniline, thiophene, pyrrole, phenyl mercaptan, and the like. Other examples include a conducting polymer selected from the group consisting of substituted and unsubstituted polyparaphenylenevinylenes, substituted and unsubstituted polyanilines, substituted and unsubstituted polyazines, substituted and unsubstituted polythiophenes, substituted and unsubstituted polyparaphenylenes, substituted and unsubstituted poly-p-phenylene sulfides, substituted and unsubstituted polyfuranes, substituted and unsubstituted polypyrroles, substituted and unsubstituted polyselenophene, substituted and unsubstituted polyacetylenes, mixtures thereof, and copolymers thereof. These conductive polymers are disclosed in a variety of patents, including U.S. Pat. No. 5,069,820 (Jen et al.); U.S. Pat. No. 5,160,457 (Elsenbaumer); U.S. Pat. No. 5,185,100 (Han et al.); U.S. Pat. No. 5,281,363 (Shacklette et al.); U.S. Pat. No. 5,378,403 (Shacklette); U.S. Pat. No. 5,422,423 (Shacklette et al.); U.S. Pat. No. 5,456,862 (Kwan-Yue et al.); U.S. Pat. No. 5,567,355 (Wessling et al.); U.S. Pat. No. 5,700,398 (Angelopoulos et al.) and U.S. Pat. No. 5,911,918 (Shacklette et al.). As described in these patents the inherently conductive polymer is often doped with an acid such as hydrochloric acid or p-toluene sulfonic acid.

Particularly preferred is a substituted polyaniline such as disclosed in U.S. Pat. No. 5,968,417 (Visawanathan) and more particularly that marketed by PolyOne Corporation as Teslart™ inherently conductive polymers. This substituted polyaniline is lignosulfonic acid-grafted polyaniline.

Plastisol

The polymer processing art is quite familiar with vinyl plastisols. These plastisols are formed from dispersion-grade poly(vinyl chloride) (PVC) resins (homopolymers and copolymers) and plasticizers. Exemplary dispersion-grade PVC resins are disclosed in U.S. Pat. Nos. 4,581,413; 4,693,800; 4,939,212; and 5,290,890, among many others such as those referenced in the above four patents.

The primary liquid plasticizers used in preparing fluid plastisols from dispersion-grade vinyl resins are organic esters of various acids such as phthalic, phosphoric, adipic, sebacic and the like. Of these, the phthalate esters are most frequently used as principal plasticizers for dispersion type vinyl chloride resins. Dialkyl phthalates containing medium length alkyl groups (e.g. from about 6 to about 12 carbon atoms in length) provide a good balance of plastisol properties when used in proportions from about 5 to about 120 parts by weight per 100 parts of the spray dried vinyl chloride resin powder. Specific examples of useful liquid plasticizers include dioctyl phthalate, butyl benzyl phthalate, dioctyl adipate, dibutyl sebacate, dinonyl phthalate and glyceryl stearates.

PolyOne Corporation (www.polyone.com) is a commercial source of vinyl plastisols for every consumer market. These dispersions of PVC resins in plasticizing liquids are enhanced by the addition of heat or light stabilizers, color pigments, flame retardants, blowing agents and other additives required for the intended product.

Vinyl plastisols are typically liquid at room temperature and can be poured, pumped, sprayed or cast, depending on the compound. These compounds can range in hardness from fishing lure plastisol with an 8 Durometer Shore A, to rotocasting plastisol (mostly PVC) with a 65 Durometer Shore D. Advantages of vinyl plastisol in coating and molding applications include ease of use and economy.

Alternatively, poly(methylmethacrylate) and its copolymers and plasticizers can be used as plastisols for the present invention.

Mixing of Inherently Conductive Polymers and Plastisols

Conventional mixing equipment is used to thoroughly mix the inherently conductive polymer into the plastisol.

The amount of inherently conductive polymer added to the plastisol can range from about 1 to about 50, and preferably from about 5 to about 25 weight percent of the total mixture.

Optional Ingredients

A variety of ingredients commonly used in the coatings industry can also be included in the mixture of the present invention. Non-limiting examples of such optional additives include slip agents, antiblocking agents, antioxidants, ultraviolet light stabilizers, quenchers, plasticizers, mold release agents, lubricants, antistatic agents, fire retardants, and fillers such as glass fibers, talc, chalk, or clay. Of these fillers, the properties of nanoclay can add stiffness, toughness, and charring properties for flame retardancy. Such optional additives can be included in the mixture of the present invention in an amount from about 0 to about 95, and preferably from about 0.1 to about 50 weight percent. Most preferably, the amount is about 1 to about 40 weight percent of the mixture.

Any conventional colorant useful in coatings and paints is also acceptable for use in the present invention. Conventional colorants can be employed, including inorganic pigments such as titanium dioxide, iron oxide, chromium oxide, lead chromate, carbon black, silica, talc, china clay, metallic oxides, silicates, chromates, etc., and organic pigments, such as phthalocyanine blue, phthalocyanine green, carbazole violet, anthrapyrimidine yellow, flavanthrone yellow, isoindoline yellow, indanthrone blue, quinacridone violet, perylene reds, diazo red and others. The amount of colorant can range from none at all to about 40, and preferably from about 1.5 to about 20 weight percent of the mixture.

Graphite is also desirable as an optional ingredient to the mixture. The graphite can be natural or synthetically produced and in the form of platelets of commercially available, conventional size. The amount of graphite can range from about none at all to about 35, and preferably from about 10 to about 20 weight percent of the mixture. The graphite platelets have very low surface resistivities along their planar surfaces, which complements the particulate nature of the inherently conductive polymers for condensed packing of both types of materials in a film formed by the plastisol.

USEFULNESS OF THE INVENTION

All of the advantages and usefulness of a vinyl plastisol as disclosed in the three United States patents above are also present in the mixture of the present invention. But the inherently conductive polymer ingredient adds to those properties by making the mixture electrically active and capable of serving as an electrostatic dissipative agent.

Surface resistivities, using the Four Point Probe test (ASTM D-257-99) can range from about $1 \times 10^3$ to about $1 \times 10^{12}$ Ohms/square.

The use of vinyl plastisol to manufacture ESD articles is not adversely affected by the presence of ICP. Indeed, all of the conventional coating techniques for vinyl plastisols are also available for the present invention. This versatility would not be true if the vinyl plastisol were to be rendered electrostatically dissipative via the addition of conductive carbon black or other electrostatic dissipative solids. The increase of viscosity caused by such electrostatic dissipative solids would reduce or eliminate the ability to use some or all of the following manufacturing techniques common to plastisol processing.

Dip Coating: When the plastisol coating becomes a functional part of the mold itself, the process is called dip coating. The metal insert may or may not have a requirement for an adhesive primer. Common uses include tool handles and grips; textiles; wire grates and baskets; plating racks; conveyor hooks; and the like. Dip coating can be either hot dipping or cold dipping.

Hot Dipping: By far the most common dip-coating processing technique, hot dipping requires an item to be heated first before immersion into the plastisol. The heat causes the plastisol coating to gel on the hot form.

Cold Dipping: Preheating the metal part is not required; the amount of pickup obtained depends largely on the viscosity and thixotropic ration of the plastisol.

Molding: Several types of molding are common to plastisol applications. Slush Molding is used to produce hollow, flexible items by filling a mold with plastisol, heating sufficiently to gel a layer next to the inner mold surface, and then draining the excess plastisol. The gelled layer is then completely fused and stripped from the mold. Rotational Molding involves hollow flexible or rigid forms with complex shapes. The process is done using a two-part mold filled with a predetermined weight of plastisol, inserted into a heated oven and rotated on two planes simultaneously. Dip Molding refers to the process of dipping a solid mold; gelling, fusing and stripping the hollow part. Open Molding is a process of molding directly in, or into, a finished article such as automotive air filters.

Other Coating: Several types of coating employ movement of the plastisol relative to the item or the item relative to the plastisol. One skilled in the art readily can employ knife coating, roll coating, reverse roll coating, etc. according to techniques taught in encyclopedias, other technical literature, or the patent literature, without undue experimentation. One reason for such easy adaptation of the mixtures of the present invention to conventional plastisol coating is that the presence of inherently conductive polymer does not adversely affect viscosity of the mixture, and certainly not as much as a plastisol having conductive carbon black therein.

Vinyl plastisols can be certified for end-use automotive, FDA, UL, ASTM, NSF, USDA, military, medical or customer-specific applications.

Any article that needs ESD properties suitable for preparation from a vinyl plastisol can be prepared from the present invention. Non-limiting examples of ESD plastisol-made articles include belting, flooring, gloves, tray liners, and any other article that is used during the manufacturing of electronic components. Other uses include medical and pharmaceutical clean rooms to minimize accumulation of dust and other contaminants; environments where explosive materials as made or stored to minimize static discharge that might cause a spark that might ignite the explosive materials; other workplace uses where workers operate in low-humidity environments where static shock is a safety, health, or comfort issue; coated textiles (both woven and nonwoven); and conveyor belts and other automated transfer equipment in which static discharge could affect adversely any electronic device being transported or being used to monitor the transport process (including so-called "smart tags" on consumer goods).

Further embodiments are described in the following examples.

EXAMPLES

Table 1 shows the commercial ingredients used in Examples 1-5 and Comparison Example A.

TABLE 1

Source of Ingredients

| Ingredient Name | Purpose | Brand Name | Generic Name | Commercial Source | Source Location |
|---|---|---|---|---|---|
| Vinyl Plastisol | Film former | 150–255 Natural | fPVC | PolyOne Corporation | Avon Lake, OH |
| Inherently Conductive Polymer | Electrostatic Dissipation | Teslart ™ | Lignosulfonic acid-grafted polyaniline | PolyOne Corporation | Avon Lake, OH |
| Graphite | Electrostatic Dissipation | 5026 | Graphite | Superior Graphite Co. | Chicago, IL |

Table 2 shows the Recipes, Method of Preparation, and resulting Properties of Examples 1-3 of mixtures of the present invention.

TABLE 2

Recipes, Preparation, and Properties

| Ingredient Name | Example 1 | 2 | 3 |
|---|---|---|---|
| Recipes (in Parts) | | | |
| 150-255 Vinyl Plastisol | 100.00 | 100.00 | 100 |
| Teslart ™ | 17.19 | 17.19 | 8.59 |
| Graphite | 0 | 4.17 | 17.19 |
| Preparation | | | |
| Mixing Equipment | Cowels | Cowels | Cowels |
| Mixing Temp. | Keep Below 35° C. | Keep Below 35° C. | Keep Below 35° C. |
| Mixing Speed | 200-500 RPM | 200-500 RPM | 200-500 RPM |
| Order of Addition of Ingredients | Prepared plastisol then mixed in Teslart followed by graphite | Prepared plastisol then mixed in Teslart followed by graphite | Prepared plastisol then mixed in Teslart followed by graphite |
| Form of Product After Mixing | Liquid Dispersion | Liquid Dispersion | Liquid Dispersion |
| Properties | | | |
| Brookfield Viscosity (ASTM D1824-95) 20 RPM, Spindle #6, Centipoise | 16,000 | 22,000 | 11,500 |
| Surface Resistivity (ASTM D257-99) Surface Resistance, Ohms/square | 5.0 * 10E6 | 2.1 * 10E4 | 8.7 * 10E9 |

A review of Examples 1-3 shows that higher amounts of inherently conductive polymer (Examples 1 and 2) decreases surface resistivity, as compared with Example 3. Graphite added to the mixture decreased surface resistivity but increased viscosity (Example 1 compared with Example 2). Thus, from these data, one skilled in the art can customize a balance of surface resistivity and viscosity according to the needs of a particular usage, all without undue experimentation.

The invention is not limited to the above embodiments. The claims follow.

What is claimed is:

1. A mixture, comprising:
inherently conductive polymer and graphite dispersed in a plastisol, wherein the plastisol is a liquid at room temperature of a dispersion of resin in a plasticizing liquid wherein the graphite comprised up to about 35 weight percent of the mixture and the inherently conductive polymer comprised from about 1 to about 50 weight percent of the mixture.

2. The mixture of claim 1, wherein the plastisol contains polyvinyl chloride.

3. The mixture of claim 2, wherein the inherently conductive polymer is a polyaniline.

4. The mixture of claim 1, wherein the plastisol contains poly(methylmethacrylate).

5. The mixture of claim 1, wherein the inherently conductive polymer is a polyaniline.

6. The mixture of claim 5, wherein the inherently conductive polymer is lignosulfonic acid-grafted polyaniline.

7. A coating of a mixture, comprising inherently conductive polymer and graphite dispersed in a plastisol, wherein the plastisol is a liquid at room temperature of a dispersion of resin in a plasticizing liquid wherein the graphite comprised up to about 35 weight percent of the mixture and the inherently conductive polymer comprised from about 1 to about 50 weight percent of the mixture.

8. The coating of claim 7, wherein the plastisol contains polyvinyl chloride.

9. The coating of claim 8, wherein the inherently conductive polymer is a polyaniline.

10. The coating of claim 7, wherein the plastisol contains poly(methylmethacrylate).

11. The coating of claim 10, wherein the inherently conductive polymer is a polyaniline.

12. A molded article of a mixture, comprising inherently conductive polymer and graphite dispersed in a plastisol, wherein the plastisol is a liquid at room temperature of a dispersion of resin in a plasticizing liquid wherein the graphite comprised up to about 35 weight percent of the mixture and the inherently conductive polymer comprised from about 1 to about 50 weight percent of the mixture.

13. The article of claim 12, wherein the plastisol contains polyvinyl chloride or poly(methylmethacrylate) and wherein the inherently conductive polymer is a polyaniline.

* * * * *

UNITED STATES PATENT AND TRADEMARK OFFICE
CERTIFICATE OF CORRECTION

| | | |
|---|---|---|
| PATENT NO. | : 7,604,753 B2 | Page 1 of 1 |
| APPLICATION NO. | : 10/595696 | |
| DATED | : October 20, 2009 | |
| INVENTOR(S) | : Stephen D. Horton | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 497 days.

Signed and Sealed this

Fifth Day of October, 2010

David J. Kappos
*Director of the United States Patent and Trademark Office*